United States Patent
Aoyagi et al.

(10) Patent No.: US 8,343,676 B2
(45) Date of Patent: *Jan. 1, 2013

(54) FUEL CELL VEHICLE, AND METHOD OF SUPPLYING ELECTRIC POWER

(75) Inventors: Satoshi Aoyagi, Shimotsuke (JP); Hibiki Saeki, Utsunomiya (JP); Hiroyuki Abe, Utsunomiya (JP); Hiroaki Takanohashi, Sakura (JP)

(73) Assignee: Honda Motor Co., Ltd., Tokyo (JP)

( * ) Notice: Subject to any disclaimer, the term of this patent is extended or adjusted under 35 U.S.C. 154(b) by 304 days.

This patent is subject to a terminal disclaimer.

(21) Appl. No.: 12/203,688

(22) Filed: Sep. 3, 2008

(65) Prior Publication Data

US 2009/0008167 A1  Jan. 8, 2009

Related U.S. Application Data

(62) Division of application No. 11/395,675, filed on Mar. 31, 2006, now Pat. No. 7,438,984.

(30) Foreign Application Priority Data

Mar. 31, 2005  (JP) ................................ 2005-102849

(51) Int. Cl.
  *H01M 8/04* (2006.01)
(52) U.S. Cl. ...... 429/432; 429/428; 429/430; 180/65.31
(58) Field of Classification Search .................... None
See application file for complete search history.

(56) References Cited

U.S. PATENT DOCUMENTS

| | | | |
|---|---|---|---|
| 5,334,463 | A | 8/1994 | Tajima et al. |
| 5,560,218 | A | 10/1996 | Jang et al. |
| 6,158,537 | A | 12/2000 | Nonobe et al. |
| 6,244,368 | B1 | 6/2001 | Ando et al. |
| 6,255,008 | B1 | 7/2001 | Iwase et al. |

(Continued)

FOREIGN PATENT DOCUMENTS

JP  2002-118981  4/2002

(Continued)

OTHER PUBLICATIONS

U.S. Office Action for U.S. Appl. No. 11/396,194, dated Aug. 27, 2008.

(Continued)

*Primary Examiner* — Ula C Ruddock
*Assistant Examiner* — Tony Chuo
(74) *Attorney, Agent, or Firm* — Nelson Mullins Riley & Scarborough LLP; Anthony A. Laurentano

(57) ABSTRACT

A fuel cell vehicle has a fuel cell for generating electric power by being supplied with a reactive gas, an electric storage device, a first power supply line connected to the fuel cell, a second power supply line connected to the electric storage device, and a main DC-to-DC converter for performing bidirectional voltage conversion between the first power supply line and the second power supply line, an electric motor to propel the vehicle and a first electric accessory connected to the first power supply line, a second electric accessory having at least a portion connected to the second power supply line.

8 Claims, 17 Drawing Sheets

U.S. PATENT DOCUMENTS

| | | |
|---|---|---|
| 6,321,145 B1 | 11/2001 | Rajashekara |
| 6,428,917 B1 | 8/2002 | Lacy et al. |
| 6,628,011 B2 | 9/2003 | Droppo et al. |
| 6,645,653 B2 | 11/2003 | Kashiwagi et al. |
| 6,646,413 B2 | 11/2003 | Autenrieth et al. |
| 6,777,909 B1 | 8/2004 | Aberle et al. |
| 6,847,127 B1 | 1/2005 | Lee et al. |
| 6,920,948 B2 | 7/2005 | Sugiura et al. |
| 6,960,400 B2 | 11/2005 | Hara et al. |
| 7,091,625 B2 | 8/2006 | Okusawa et al. |
| 7,244,524 B2 | 7/2007 | McCluskey et al. |
| 2002/0038732 A1 | 4/2002 | Sugiura et al. |
| 2003/0124400 A1 | 7/2003 | Hara et al. |
| 2004/0136211 A1 | 7/2004 | Itou |
| 2005/0014047 A1 | 1/2005 | Hatsugai et al. |
| 2005/0224265 A1 | 10/2005 | Mizuno |

FOREIGN PATENT DOCUMENTS

| | | |
|---|---|---|
| JP | 2003-153461 | 5/2003 |
| JP | 2004-180461 | 6/2004 |
| JP | 2004-193063 | 7/2004 |
| JP | 2004-222376 | 8/2004 |
| JP | 2004-234907 | 8/2004 |

OTHER PUBLICATIONS

Maxim, "DC-DC Converter Tutorial," retrieved online at http://pdfserv.maxim-ic.com/en/an/AN2031.pdf (2000).

Prior Art

Prior Art

FUEL CELL VEHICLE, AND METHOD OF SUPPLYING ELECTRIC POWER

RELATED APPLICATIONS

This application is a divisional application of U.S. application Ser. No. 11/395,675 filed Mar. 31, 2006, now U.S. Pat. No. 7,438,984, which claims priority to Japanese Patent Application No. 2005-102849 filed Mar. 31, 2005. The contents of the aforementioned applications are hereby incorporated by reference.

BACKGROUND OF THE INVENTION

1. Field of the Invention

The present invention relates to a fuel cell vehicle, and a method of supplying electric power, and more particularly to a fuel cell vehicle having an electric storage device and a DC-to-DC converter for performing bidirectional voltage conversion between a power supply line connected to the fuel cell and a power supply line connected to the electric storage device and a method of supplying electric power in such a fuel cell vehicle.

2. Description of the Related Art

Recently, fuel cell vehicles carrying fuel cells, which are of excellent fuel efficiency and environment-friendly nature, as propulsive power sources have been developed and put to practical use.

Some fuel cell vehicles also carry electric storage devices for assisting in supplying electric power to meet high loads and load variations and also for storing regenerated electric power.

If the voltage generated by a fuel cell and the rated voltage of an electric storage device are different from each other, then a DC-to-DC converter for performing bidirectional voltage conversion is connected between a power supply line connected to the fuel cell and a power supply line connected to the electric storage device. The DC-to-DC converter allows electric power to be efficiently transferred between the fuel cell and the electric storage device and also allows regenerated electric power to be efficiently stored in the electric storage device.

Fuel cell vehicles incorporate fuel cell accessories for operating fuel cells, i.e., an air compressor, a hydrogen supply pump, a coolant circulation pump, etc., in addition to ordinary motor vehicle accessories including an air conditioner, windshield wipers, power window motors, etc. mounted on general motor vehicles.

One type of connections used for supplying electric power to motor vehicle accessories and fuel cell accessories on fuel cell vehicles is disclosed in Japanese Laid-Open Patent Publication No. 2004-193063. As shown in FIG. 16 of the accompanying drawings, the disclosed system has a power supply line 3 interconnecting a fuel cell 1 and an inverter 2, and power supply lines are branched from the power supply line 3 for supplying electric power to a motor vehicle accessory 4 and a fuel cell accessory 5. The electric power from the power supply line 3 is reduced in voltage by a DC-to-DC converter 7 before it is supplied to an electric storage device 6. The DC-to-DC converter 7 is capable of converting voltages bidirectionally.

Japanese Laid-Open Patent Publication No. 2002-118981 discloses another system of connections as shown in FIG. 17 of the accompanying drawings. As shown in FIG. 17, a power supply line 8 interconnects an electric storage device 6 and a DC-to-DC converter 7, and power supply lines are branched from the power supply line 8 for supplying electric power to a motor vehicle accessory 4 and a fuel cell accessory 5.

In the systems disclosed in Japanese Laid-Open Patent Publication No. 2004-193063 and Japanese Laid-Open Patent Publication No. 2002-118981, since both the vehicle accessory and the fuel cell accessory are supplied with electric power from the same power supply line, they need to be dedicated accessories compatible with the rated voltage of the power supply line, or a DC-to-DC converter needs to be connected to at least one of the vehicle accessory and the fuel cell accessory, making the electric system complex.

If a complex system including many accessories is constructed based on the system revealed in Japanese Laid-Open Patent Publication No. 2004-193063, then each of the accessories is connected to the power supply line 3 interconnecting the fuel cell and the inverter (see FIG. 16). Therefore, these accessories are dedicated accessories compatible with the voltage according to the specifications of the fuel cell or the electric motor, and are hence not for general use. Particularly, as electric accessories on other vehicles such as general engine-driven vehicles or hybrid vehicles cannot be used as those accessories, the complex system is highly costly to construct.

If accessories are to be added to the system disclosed in Japanese Laid-Open Patent Publication No. 2002-118981, then they are connected to the power supply line 8 that is connected to the electric storage device 6 shown in FIG. 17. However, the system with the added accessories is disadvantageous in that if the DC-to-DC converter fails and the electric power generated by the fuel cell cannot be supplied to the power supply line 8, then the distance that the fuel cell vehicle is able to travel subsequently will be shortened. Specifically, since the fuel cell needs to be supplied with a reactive gas for its operation, it is necessary to operate an air compressor, pumps, etc. for operating the fuel cell. However, they are energized by only the electric power which remains in the electric storage device. Consequently, even if a sufficient amount of hydrogen gas is stored in the fuel tank, since no electric power is obtained from the stored hydrogen gas for actuating the air compressor and the pumps, the fuel cell is shut off at the time the discharge of electric power from the electric storage device is finished. In addition, inasmuch as the air compressor and the pumps consume a relatively large amount of electric power, the electric storage device discharges the stored electric power at a high rate and cannot be operated continuously for a long period of time in the event of a failure of the DC-to-DC converter.

SUMMARY OF THE INVENTION

It is an object of the present invention to provide a fuel cell vehicle which allows electric accessories having a plurality of rated voltages depending on applications to be used, is of a highly general nature, and can be constructed inexpensively, and a method of supplying electric power in such a fuel cell vehicle.

Another object of the present invention is to provide a fuel cell vehicle including a fuel cell and a DC-to-DC converter, which system is capable of operating the fuel cell continuously for a long period of time even in the event of a failure of the DC-to-DC converter, and a method of supplying electric power in such a fuel cell vehicle.

a fuel cell vehicle for a fuel cell according to an aspect of the present invention has a fuel cell for generating electric power by being supplied with a reactive gas; an electric storage device; a first power supply line connected to said fuel cell; a second power supply line connected to said electric storage device; a main DC-to-DC converter for performing bidirectional voltage conversion between said first power supply line and said second power supply line; an electric motor to propel the vehicle and a first electric accessory connected to said first power supply line being supplied with electric power from said first power supply line; and a second electric accessory having at least a portion connected to said second power supply line through an auxiliary DC-to-DC converter for being supplied with electric power from said second power supply line.

Since the first electric accessory is supplied with electric power from the first power supply line and the second electric accessory is supplied with electric power from the second power supply line, the first electric accessory and the second electric accessory can be set to different voltage specifications depending on applications, allowing the electric system to have a better energy efficiency and to be constructed inexpensively.

As the auxiliary electric system does not include the first electric accessory, an electric system on a vehicle other than fuel cell vehicles can be used as the auxiliary electric system. The electric system according to the present invention is of a better versatility and is inexpensive to construct. Even if the first DC-to-DC converter accidentally fails to operate, since the first electric accessory is continuously supplied with electric power from the first power supply line, the first electric accessory is not essentially affected by a remaining amount of electric power stored in the electric storage device, and the fuel cell can continuously be operated for a considerably long period of time.

The first electric accessory serves as at least part of a fuel cell accessory for operating the fuel cell, and the second electric accessory serves as an electric accessory other than the fuel cell accessory. Consequently, the fuel cell accessory may be improved energy efficiency, and ordinary vehicle accessories other than the fuel cell accessory may be general-purpose accessories, allowing the electric system to be constructed inexpensively.

A fuel cell vehicle according to another aspect of the present invention has a fuel cell for generating electric power by being supplied with a reactive gas; a first power supply line connected to said fuel cell; a first electric accessory serving as at least part of a fuel cell accessory for operating said fuel cell, said first electric accessory being connected to said first power supply line for being supplied with electric power from said first power supply line; an electric motor to propel the vehicle; an auxiliary electric system; and a main DC-to-DC converter for performing bidirectional voltage conversion, said main DC-to-DC converter connecting said auxiliary electric system to said first power supply line; said auxiliary electric system comprising: a first electric storage device; a second power supply line connecting said first electric storage device and said main DC-to-DC converter to each other; and a second electric accessory serving as an electric accessory other than said fuel cell accessory, wherein at least a portion of said second electric accessory being connected to said second power supply line through an auxiliary DC-to-DC converter, wherein the second electric accessory is supplied with electric power from said second power supply line.

A method of supplying electric power according to the present invention includes the steps of supplying an electric motor and a first electric accessory with electric power through a first power supply line from a fuel cell which generates electric power by being supplied with a reactive gas; supplying electric power by a main DC-to-DC converter capable of performing bidirectional voltage conversion, through a second power supply line to a second electric accessory or to an electric storage device to charge the electric storage device; supplying said second electric accessory with electric power through said second power supply line from said electric storage device, wherein at least a portion of said second electric accessory is connected to said second power supply line through an auxiliary DC-to-DC converter; and supplying electric power having a voltage converted from a voltage on said second power supply line by said main DC-to-DC converter, through said first power supply line to said electric motor or said first electric accessory.

Therefore, the first electric accessory and the second electric accessory can be set to different voltage specifications depending on applications, allowing the electric system to have a improved energy efficiency and to be constructed inexpensively.

DESCRIPTION OF THE PREFERRED EMBODIMENT

A fuel cell vehicle, and a method of supplying electric power according to an embodiment of the present invention will be described below with reference to FIGS. 1 through 15.

Figure 1:
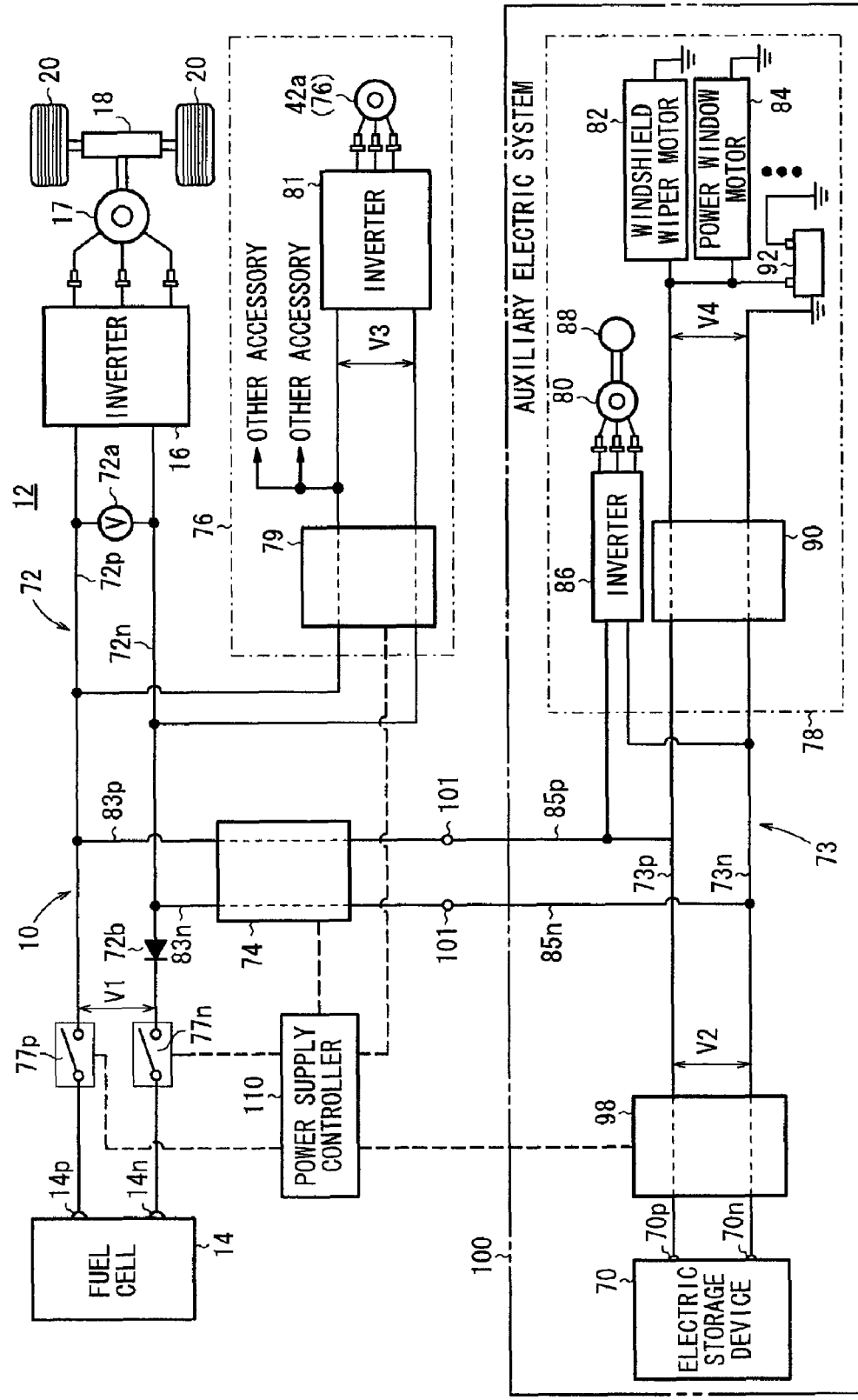
FIG. 1 is a block diagram of a fuel cell vehicle according to an embodiment of the present invention.

As shown in FIG. 1, the electric system, generally denoted by 10, is mounted on a fuel cell vehicle 12. On fuel cell vehicle 12, electric power generated by a fuel cell 14 is supplied through an inverter 16 to control a three-phase propulsive electric motor 17 to rotate its rotatable shaft, causing a gear mechanism 18 including a differential gear and a transmission connected to the rotatable shaft of the electric motor 17 to rotate drive wheels 20. The fuel cell 14 comprises a large-power fuel cell for generating large electric power to provide sufficient drive forces to propel the fuel cell vehicle 12. A voltage generated by the fuel cell 14 is herein defined as a voltage V1.

Figure 2:
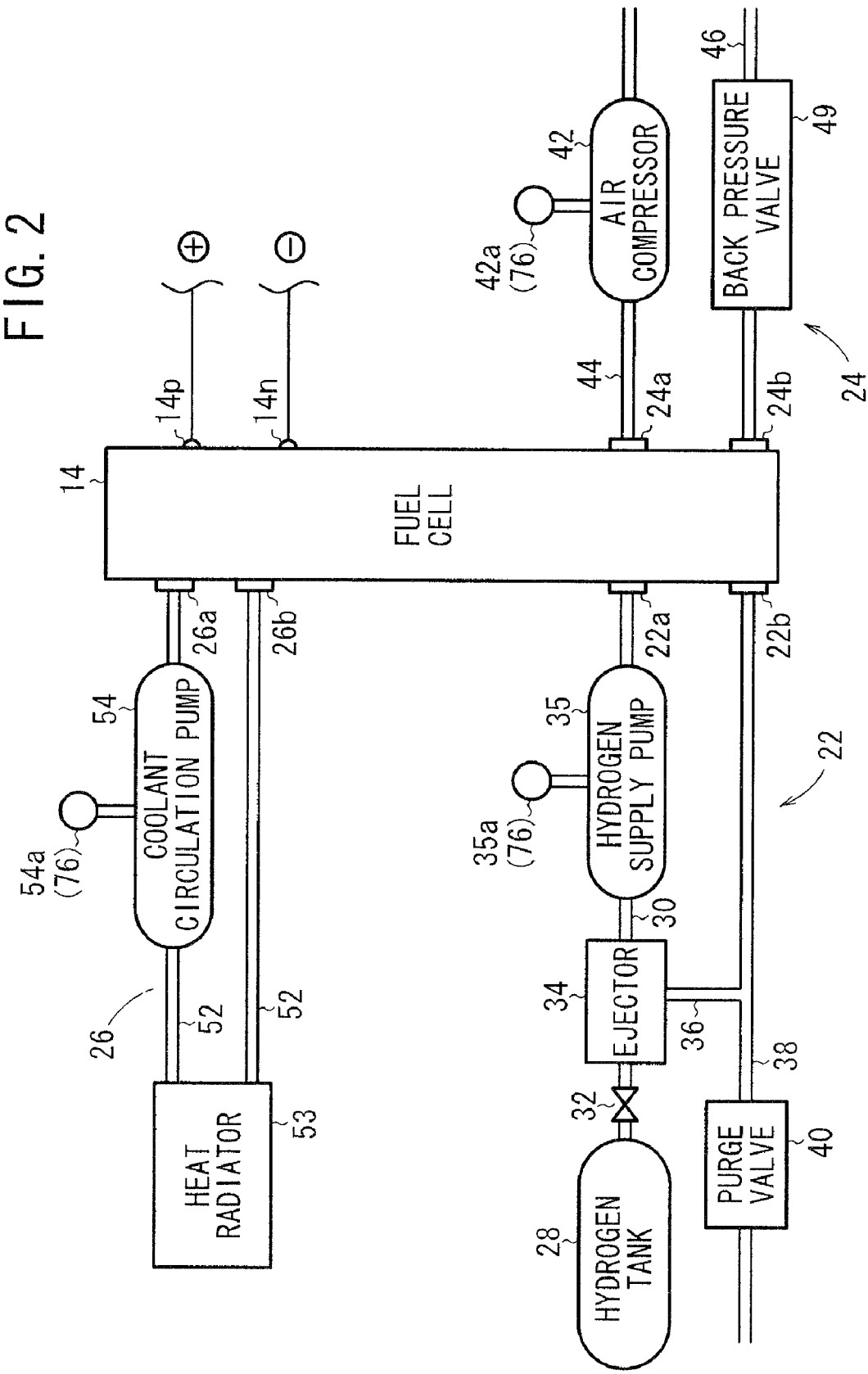
FIG. 2 is a block diagram of a fuel cell vehicle.

As shown in FIG. 2, a fuel gas supply system 22, a reactive gas supply system 24, and a coolant supply system 26 are connected to the fuel cell 14. The fuel gas supply system 22 has a hydrogen supply passage 30 connected to a hydrogen tank 28 and a fuel gas inlet port 22a of the fuel cell 14. The hydrogen supply passage 30 is connected to a shutoff valve 32, an ejector 34, and a hydrogen supply pump 35 that are successively arranged in the order named from the hydrogen tank 28.

The fuel cell 14 has a fuel gas outlet port 22b connected to a hydrogen circulation passage 36 which is connected to the hydrogen supply passage 30 through the ejector 34. A purge valve 40 is connected to a hydrogen discharge passage 38 that is branched from the hydrogen circulation passage 36.

The reactive gas supply system 24 has an air supply passage 44 connected to an air compressor (or a supercharger) 42 and a reactive gas inlet port 24a of the fuel cell 14. The fuel cell 14 has a reactive gas outlet port 24b connected to an air discharge passage 46 which is connected to an exhaust pipe 50 through a back pressure valve 49.

The coolant supply system 26 has a coolant circulation passage 52 connected to a coolant inlet port 26a and a coolant outlet port 26b of the fuel cell 14. The coolant circulation passage 52 is connected to a coolant circulation pump 54 for circulating a coolant. The coolant circulation passage 52 has a heat radiator 53 for radiating heat from the coolant to cool the coolant as the coolant is circulated through the heat radiator 53 by the coolant circulation pump 54.

In the fuel cell 14, a hydrogen gas (fuel gas) supplied from the hydrogen supply passage 30 by the hydrogen supply pump 35 and air (reactive gas) compressed to a predetermined pressure by the air compressor 42 and supplied from the air supply passage 44 are sent to respective electrodes, and consumed by an electrochemical reaction in electrode catalyst layers to generate electric power. The generated electric power is output from a positive output terminal 14p and a negative output terminal 14n. In the electric system 10, positive and negative components provided in pairs are denoted by reference numerals with a suffix "p" and a suffix "n", respectively.

An exhaust gas including an unused hydrogen gas in the fuel cell 14 is discharged from the fuel gas outlet port 22b into the hydrogen circulation passage 36. The exhaust gas flows through the hydrogen circulation passage 36 and is supplied from the ejector 34 into the hydrogen supply passage 30, and is supplied again as the fuel gas to the fuel cell 14. The air that is consumed in the fuel cell 14 is discharged from the reactive gas outlet port 24b into the air discharge passage 46.

The fuel cell system for operating the fuel cell 14 is not limited to the above structure. The fuel cell system may be a system free of the hydrogen supply pump 35 or a system wherein the hydrogen supply pump 35, the air compressor 42, and the coolant circulation pump 54 may be operated by a single electric motor.

Electric motors 35a, 42a, 54a, which serve as a fuel cell accessory, operate the hydrogen supply pump 35, the air compressor 42, and the coolant circulation pump 54, respectively. The electric motors 35a, 42a, 54a are electrically connected to a first power supply line 72 (see FIG. 1) by electric connections that are omitted from illustration in FIG. 2.

As shown in FIG. 1, the electric system 10 has an electric storage device (first electric storage device) 70 a first power supply line 72 connected to the output terminals 14p, 14n of the fuel cell 14, a second power supply line 73 connected to output terminals 70p, 70n of the electric storage device 70, and a first DC-to-DC converter (main DC-to-DC converter) 74 for converting voltages bidirectionally between the first power supply line 72 and the second power supply line 73. The first power supply line 72 comprises a positive line 72p and a negative line 72n, and the second power supply line 73 comprises a positive line 73p and a negative line 73n. The electric storage device 70 may comprise any of various secondary battery, a lead battery, a lithium ion battery, an electric double-layer capacitor, or the like.

The electric system 10 has a first electric accessory 76 for being supplied with electric power from the first power supply line 72 and a second electric accessory 78 for being supplied with electric power from the second power supply line 73. The first electric accessory 76 is a fuel cell accessory for operating the fuel cell 14. The second electric accessory 78 is an electric accessory other than the fuel cell accessory, and is of a general accessory for a vehicle mounted on a general motor vehicle other than the fuel cell vehicle 12.

Components of the electric system 10 which are shown in FIG. 1 as being positioned below the first DC-to-DC converter 74, i.e., the electric storage device 70, a power supply switch unit 98, the second power supply line 73, and the second electric accessory 78, jointly make up an auxiliary electric system 100 as a single unit, which is connected to the first DC-to-DC converter 74 through a terminal 101. However, the auxiliary electric system 100 is not limited to being assembled as a single unit, but may be a conceptual system in the form of a circuit that is connected through the first DC-to-DC converter 74 to the first power supply line 72 and operable under a voltage V2 (or a voltage V4), the circuit including the electric storage device 70, the second power supply line 73, and the second electric accessory 78.

The inverter 16 and the propulsive electric motor 17 are included in the electric system 10, and are supplied with electric power from the first power supply line 72. Of the electric devices mounted on the fuel cell vehicle 12, the propulsive electric motor 17 presents a particularly high load and serves as a major component on the self-propelled vehicle. The propulsive electric motor 17 may be referred to as a principal component against the first electric accessory 76 and the second electric accessory 78. The inverter 16 converts DC electric power supplied from the first power supply line 72 into three-phase AC electric power, and supplies the three-phase AC electric power at a frequency and a power level which are commensurate with the vehicle driver's action on the accelerator pedal, etc.

The first power supply line 72 has a voltage sensor 72a for measuring the voltage V1. The positive line 72p and the negative line 72n have respective main contactors 77p, 77n, and the negative line 72n has a reverse-current blocking diode 72b.

Figure 3:
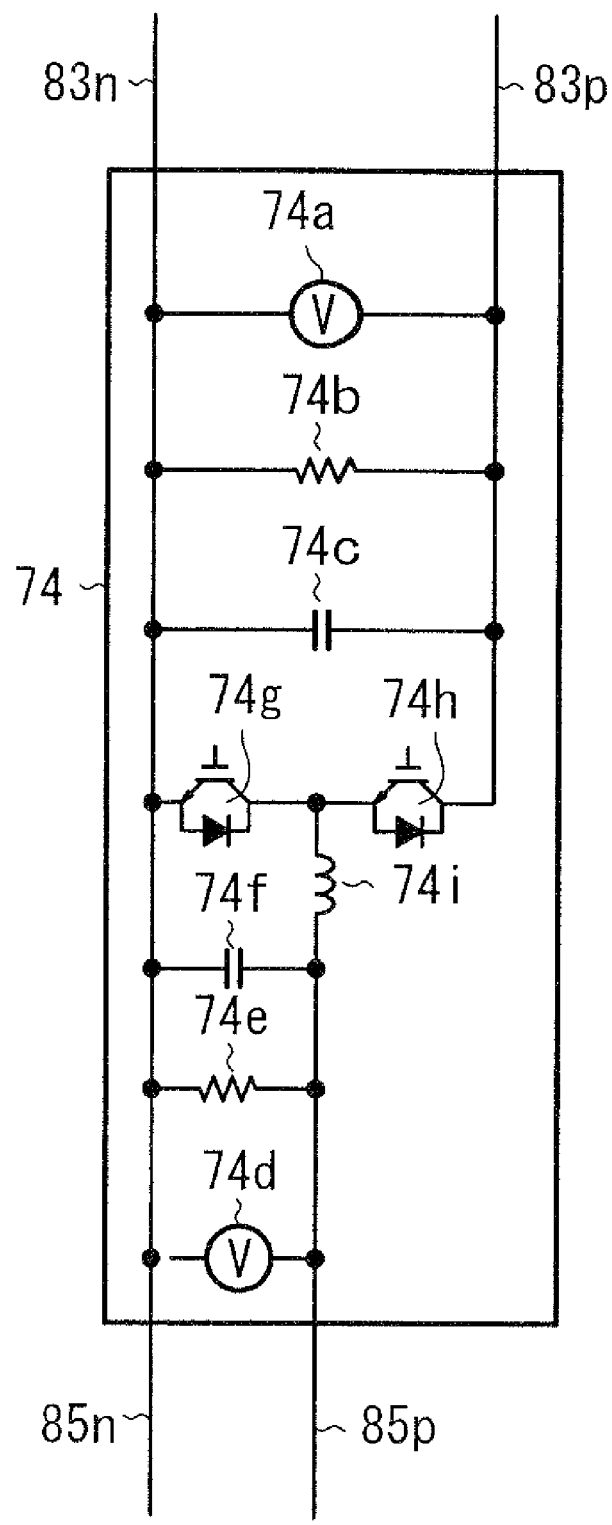
FIG. 3 is a circuit diagram of a first DC-to-DC converter.

As shown in FIG. 3, the first DC-to-DC converter 74 has a voltage sensor 74a, a protective resistor 74b, and a stabilizing capacitor 74c which are connected to the first power supply line 72, and a voltage sensor 74d, a protective resistor 74e, and a stabilizing capacitor 74f which are connected to the second power supply line 73. The first DC-to-DC converter 74 also has a voltage-converting switching device 74g and a voltage-converting switching device 74h.

The first DC-to-DC converter 74 has a pair of lines 83p, 83n, and a pair of lines 85p, 85n. The negative lines 83n, 85n are connected to each other. The switching device 74g and the switching device 74h are connected in series to each other, the voltage-converting switching device 74g being connected to the line 83n and the voltage-converting switching device 74h to the line 83p. The line 85p is connected to a branched point between the voltage-converting switching device 74g and the voltage-converting switching device 74h through a reactor 74i for stabilizing an electric current. The lines 83p, 83n are connected respectively to the positive line 72p and the negative line 72n of the first power supply line 72. The lines 85p, 85n are connected respectively to the positive line 73p and the negative line 73n of the second power supply line 73.

The switching devices 74g, 74h operate as choppers that are repeatedly turned on and off at a high frequency for thereby converting the voltage V1 of electric power supplied from the first power supply line 72 to the voltage V2. Therefore, the first DC-to-DC converter 74 supplies electric power of the voltage V2 to the second power supply line 73. The electric power thus supplied from the first power supply line 72 through the first DC-to-DC converter 74 to the second power supply line 73 is applied to charge the electric storage device 70 or supplied to the second electric accessory 78. Each of the switching devices 74g, 74h and switching devices 79d, 90d, which are to be described later, comprises a semiconductor device such as a transistor, a thyristor, an FET (Field Effect Transistor), an IGBT (Insulated Gate Bipolar Transistor), or the like.

When the propulsive electric motor 17 is put under a high load, the first DC-to-DC converter 74 converts the voltage V2 of electric power from the second power supply line 73 to the voltage V1, and supplies electric power of the voltage V1 to the first power supply line 72. At this time, the electric power on the second power supply line 73 is supplied from the electric storage device 70 as it is discharged.

As described above, the first electric accessory 76 is a fuel cell accessory for operating the fuel cell 14. The first electric accessory 76 includes the electric motor 42a for operating the air compressor 42, the electric motor 35a for operating the hydrogen supply pump 35, and the electric motor 54a for operating the coolant circulation pump 54. Of these electric motors, the electric motor 42a for operating the air compressor 42 is supplied with electric power from the first power supply line 72 through a second DC-to-DC converter (fuel cell DC-to-DC converter) 79. The first electric accessory 76 may comprise a fuel reformer.

Figure 4:
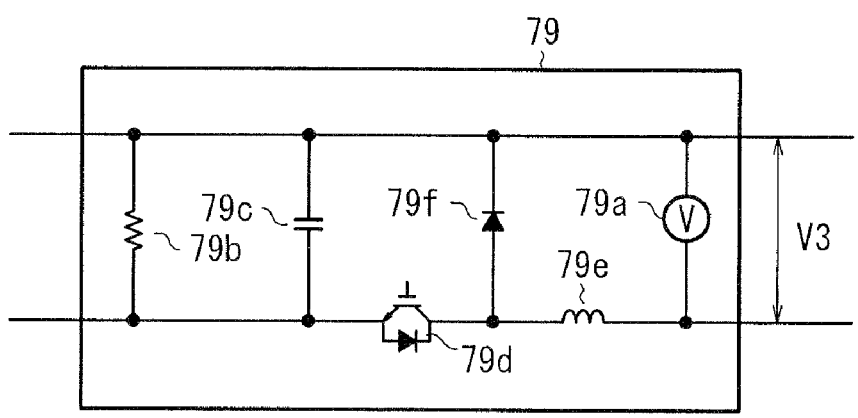
FIG. 4 is a circuit diagram of a second DC-to-DC converter.

As shown in FIG. 4, the second DC-to-DC converter 79 has a function to convert the voltage V1 of electric power on the first power supply line 72 to a voltage V3. The second DC-to-DC converter 79 comprises a voltage sensor 79a, a protective resistor 79b, a stabilizing capacitor 79c, a switching device 79d, a reactor 79e for stabilizing an electric current, and a surge-cutoff diode 79f. The electric motor 42a comprises an AC three-phase electric motor whose rotation is controlled by an inverter 81.

Figure 5:
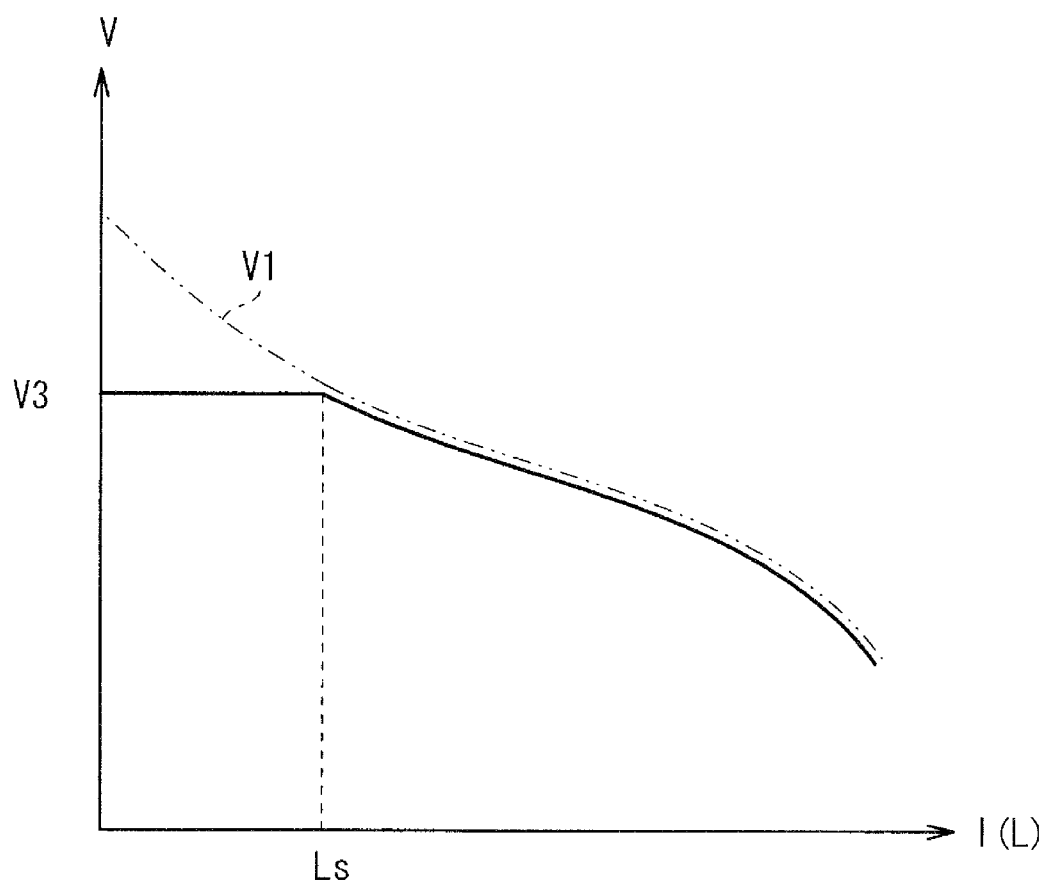
FIG. 5 is a graph of voltage control characteristics of the second DC-to-DC converter.

FIG. 5 is an IV characteristic diagram having a horizontal axis representing electric currents and a vertical axis representing voltages. FIG. 5 shows voltage characteristics of the fuel cell 14 in comparison with the voltage V3 that is controlled by the switching device 79d. When a load current I (or a load L) of the propulsive electric motor 17 is smaller than a prescribed threshold valve Ls, the switching device 79d operates as a chopper to convert the voltage V1 applied thereto to the voltage V3. When the load L is equal to or greater than the prescribed threshold valve Ls, the switching device 79d is continuously turned on to directly connect input and output terminals thereof, supplying electric power to the inverter 81 and the air compressor 42. When the input and output terminals of the switching device 79d are directly connected to each other, it generates less heat, allowing the second DC-to-DC converter 79 to be small in size.

As described above, the second electric accessory 78 is an electric accessory other than the fuel cell accessory, and represents ordinary vehicle accessories including an electrically operated air conditioner motor 80, windshield wiper motors 82, and power window motors 84, etc.

The electrically operated air conditioner motor 80 is a three-phase electric motor whose rotation is controlled by an inverter 86. Since the fuel cell vehicle 12 has no internal combustion engine mounted thereon, there is no rotational drive source that rotates at all times. Therefore, the fuel cell vehicle 12 has an electrically operated air conditioner, with a compressor 88 being operated by the electrically operated air conditioner motor 80. As no internal combustion engine is mounted on the fuel cell vehicle 12, the fuel cell vehicle 12 does not have a heat source for generating a large amount of heat. The electrically operated air conditioner is also used to heat the space in the passenger cabin of the fuel cell vehicle 12, and operates as a so-called heat pump. The electrically operated air conditioner motor 80 compresses and circulates a refrigerant by operating the compressor 88 thereby to adjust the temperature in the passenger cabin. The electrically operated air conditioner motor 80 is of a relatively large capacity as it needs to compress the refrigerant.

The windshield wiper motors 82 and power window motors 84, etc., other than the electrically operated air conditioner motor 80, of the second electric accessory 78 are connected to the second power supply line 73 through a third DC-to-DC converter (auxiliary DC-to-DC converter) 90 which converts the voltage V2 to V4 (e.g., 12 V). The third DC-to-DC converter 90 has output lines to which a lead battery 92 (second electric storage device) is connected.

The third DC-to-DC converter 90 operates to convert a voltage in the same manner as the second DC-to-DC converter 79. Specifically, the third DC-to-DC converter 90 has switching devices that operate as choppers to convert the applied voltage V2 to the voltage V4 and output the voltage V4.

Figure 6:
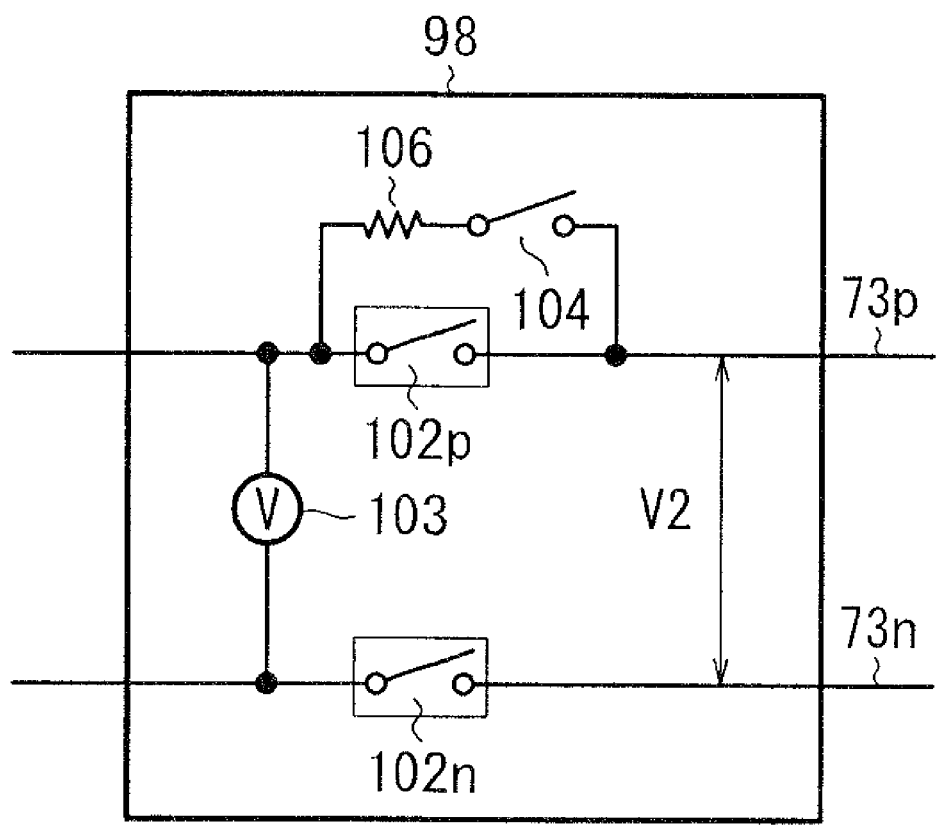
FIG. 6 is a circuit diagram of a power supply switch unit.

The electric storage device 70 is connected to the second power supply line 73 through the power supply switch unit 98 which serves to control connections. As shown in FIG. 6, the power supply switch unit 98 has a voltage sensor 103 for detecting the voltage V2, a pair of battery contactors 102p, 102n connected respectively to the positive line 73p and the negative line 73n, and a series-connected circuit of a precontactor 104 and a limiting resistor 106 which are connected in parallel to the battery contactor 102p.

The main contactors 77p, 77n, the first DC-to-DC converter 74, the second DC-to-DC converter 79, and the power supply switch unit 98 are connected to a power supply controller 110, and perform a predetermined power supply controlling process under the control of the power supply controller 110. The third DC-to-DC converter 90 is not connected to the power supply controller 110, and converts voltages by itself.

The power supply controller 110 has a CPU (Central Processing Unit) as a main control unit, a RAM (Random Access Memory) and a ROM (Read Only Memory) as a storage unit, and a drive. The CPU reads a program and executes the program in cooperation with the storage unit, etc. to perform the power supply controlling process. The power supply controller 110 is supplied with electric power from the lead battery 92, for example, and hence can operate even in the event of a shutdown of the fuel cell 14.

Electric motors 35a, 42a, 54a, which serve as the fuel cell accessory, are basically supplied with electric power from the first power supply line 72. Other fuel cell accessories, such as a controller, a sensor, etc. (not shown), which consume a small amount of electric power may be supplied with electric power from the second power supply line 73.

Figure 7:
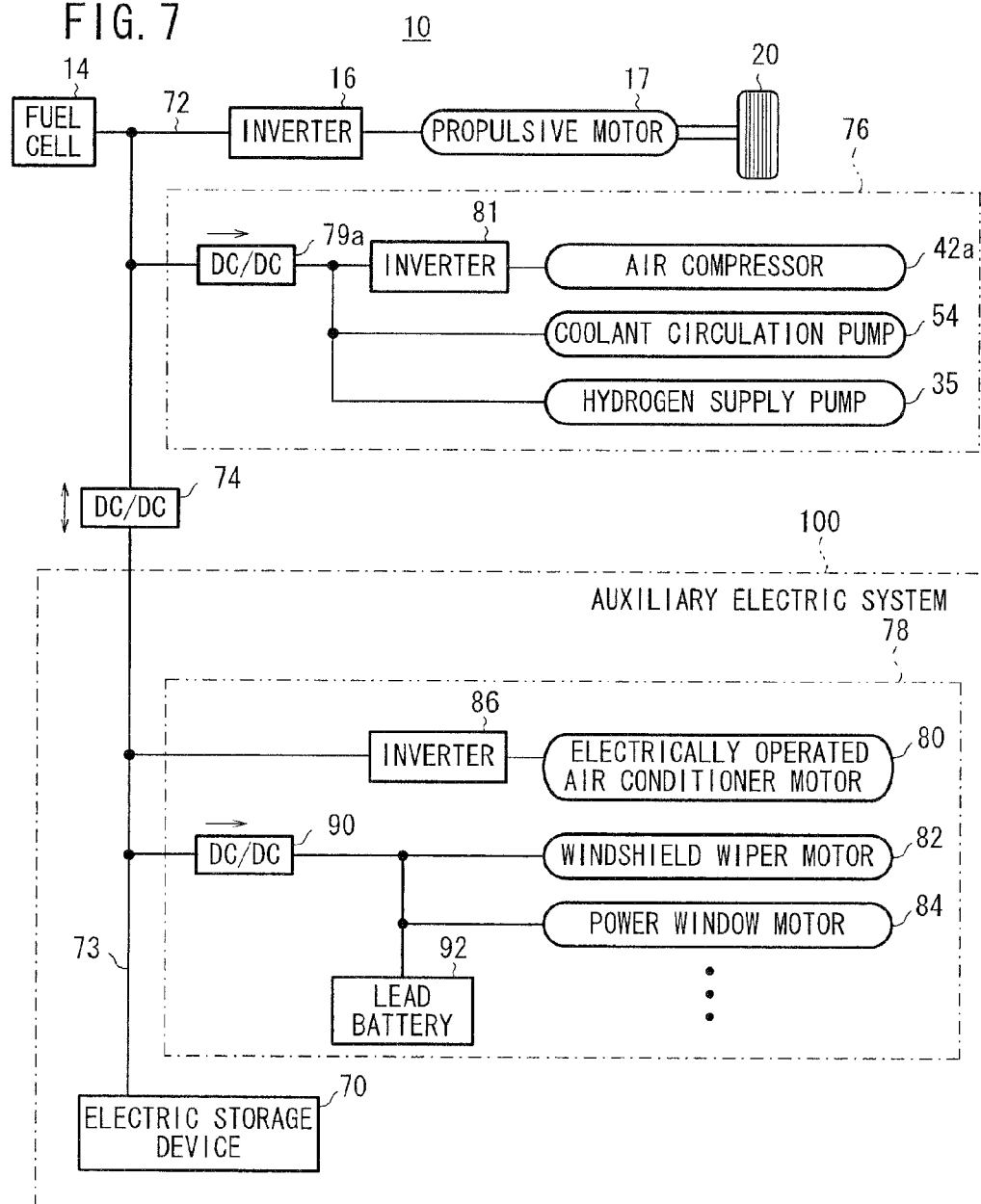
FIG. 7 is a simplified block diagram of the fuel cell vehicle.

The electric system 10 thus constructed is illustrated in simplified block form in FIG. 7. As shown in FIG. 7, the voltages on the first power supply line 72 and the second power supply line 73 are bidirectionally converted by the first DC-to-DC converter 74 in the electric system 10. The first electric accessory 76 as a fuel cell accessory for operating the fuel cell 14 is supplied with electric power branched from the first power supply line 72, and the second electric accessory 78 as an electric accessory other than the fuel cell accessory is supplied with electric power branched from the second power supply line 73. The auxiliary electric system 100 is connected to the first power supply line 72 through the DC-to-DC converter 74, and has no other connections, so that the auxiliary electric system 100 is a semiindependent system in terms of circuitry.

Hybrid electric vehicles (HEVs) which have been developed and put to practical use in recent years have an engine and an electric motor as propulsive power sources, and an electric storage device, such as the electric storage device 70, for efficiently energizing the electric motor. Hybrid electric vehicles also have an electrically operated air conditioner motor independent of the operation of the engine in order to air-condition the passenger cabin while the hybrid electric vehicle is being driven by the electric motor with the engine being shut off. Hybrid electric vehicles further have ordinary vehicle accessories including the windshield wiper motors 82 and the power window motors 84, etc.

Stated otherwise, most components of the electric system on a hybrid electric vehicle are similar to those of the auxiliary electric system 100 of the electric system 10 according to the present embodiment. Actually, the auxiliary electric system 100 can be used in common with the electric systems on the fuel cell vehicle 12 and the hybrid electric vehicle, and hence is of a high versatility and high compatibility with those electric systems. Therefore, the auxiliary electric system 100 offers advantages of scale and is inexpensive to construct.

Figure 8:
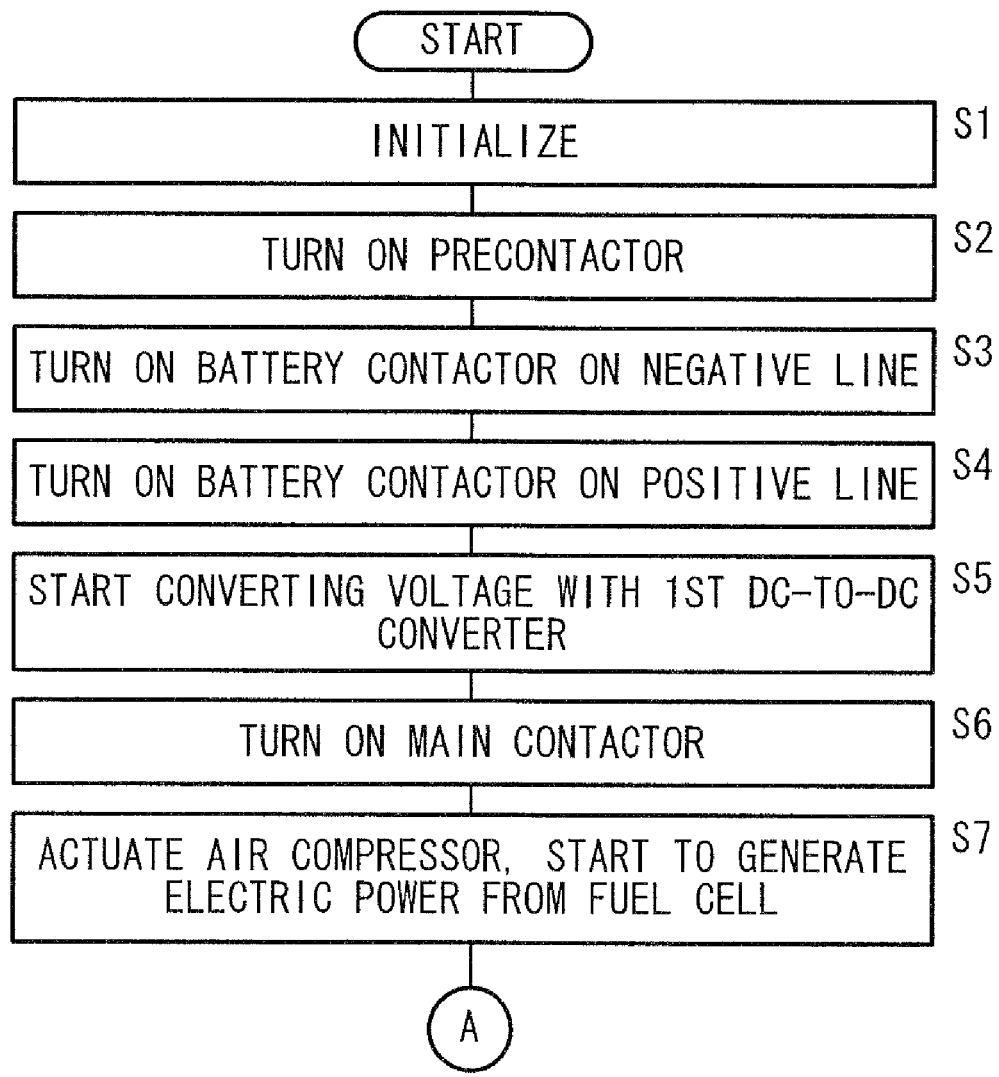
FIGS. 8 through 10 are a flowchart showing a method of supplying electric power.
Figure 9:
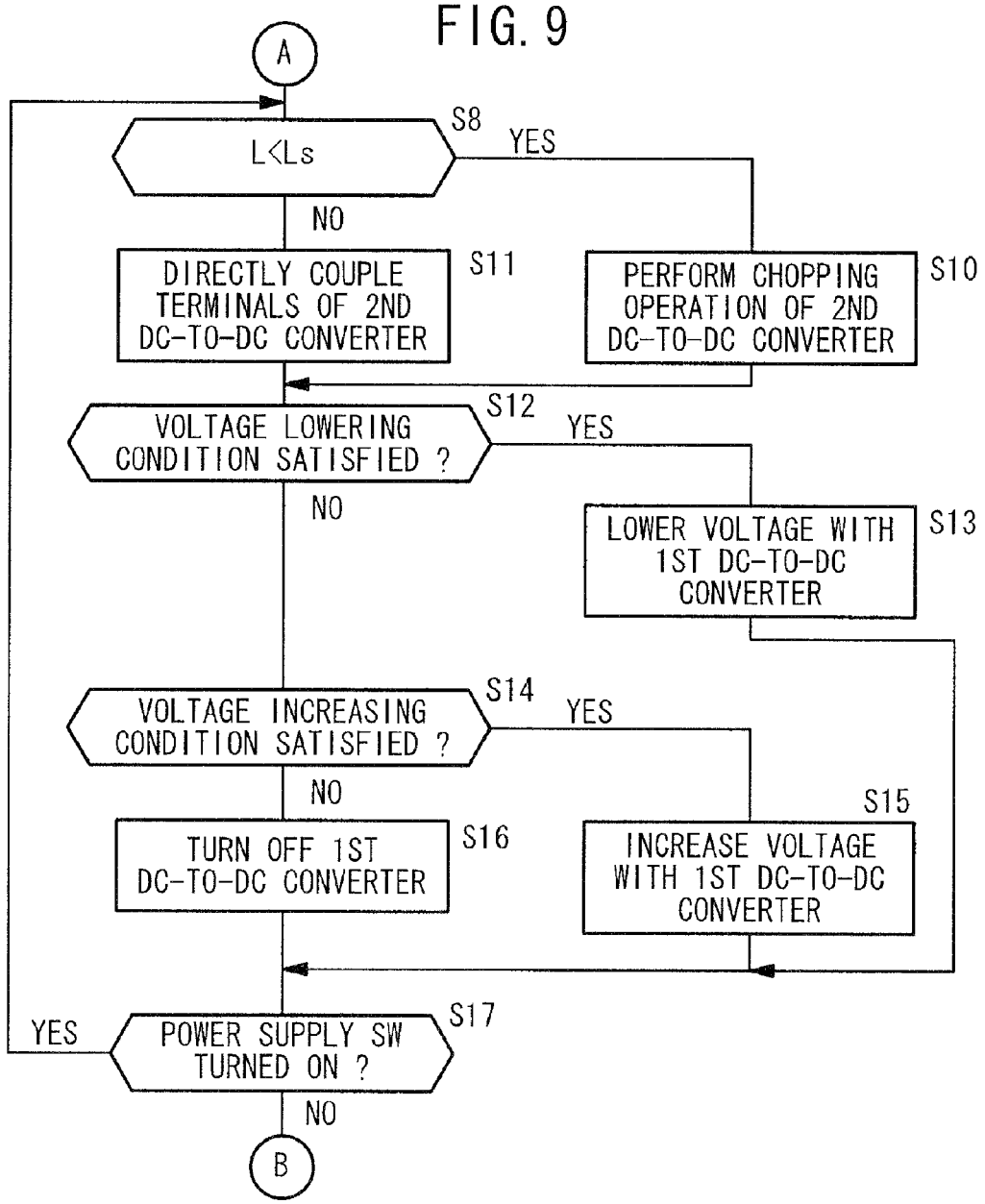
Figure 10:
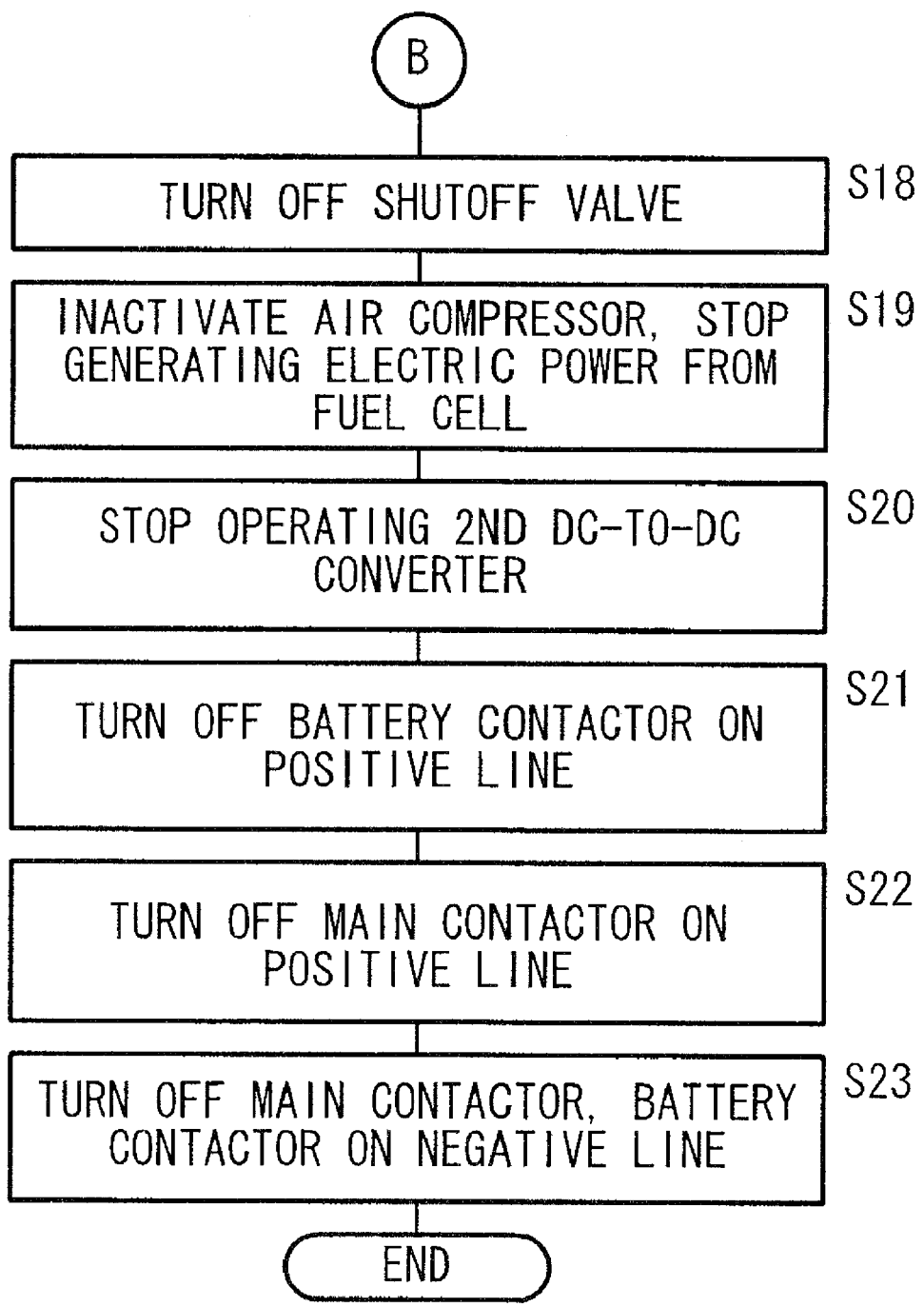
Figure 11:
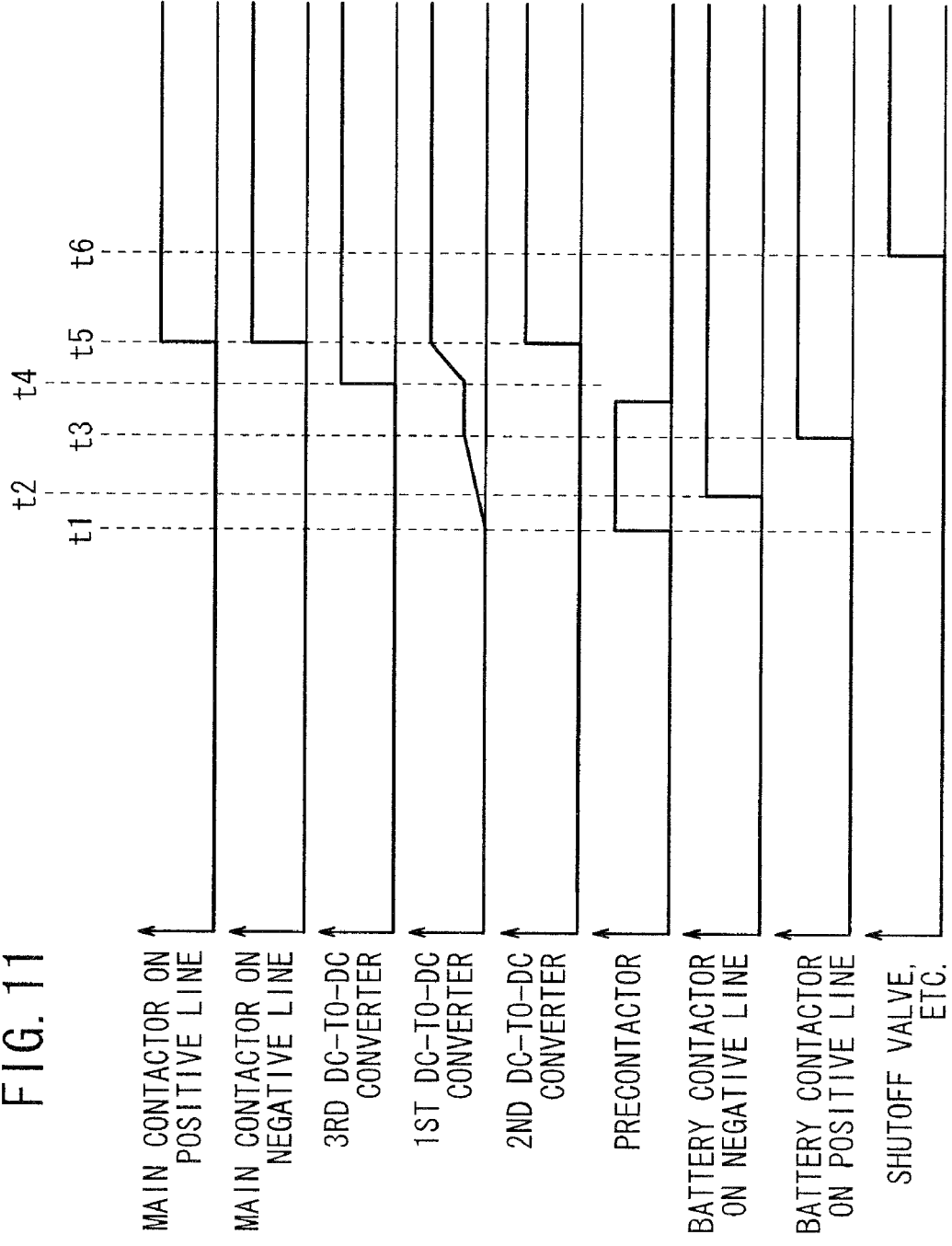
FIG. 11 is a timing chart of an activating sequence of the electric system for the fuel cell.
Figure 12:
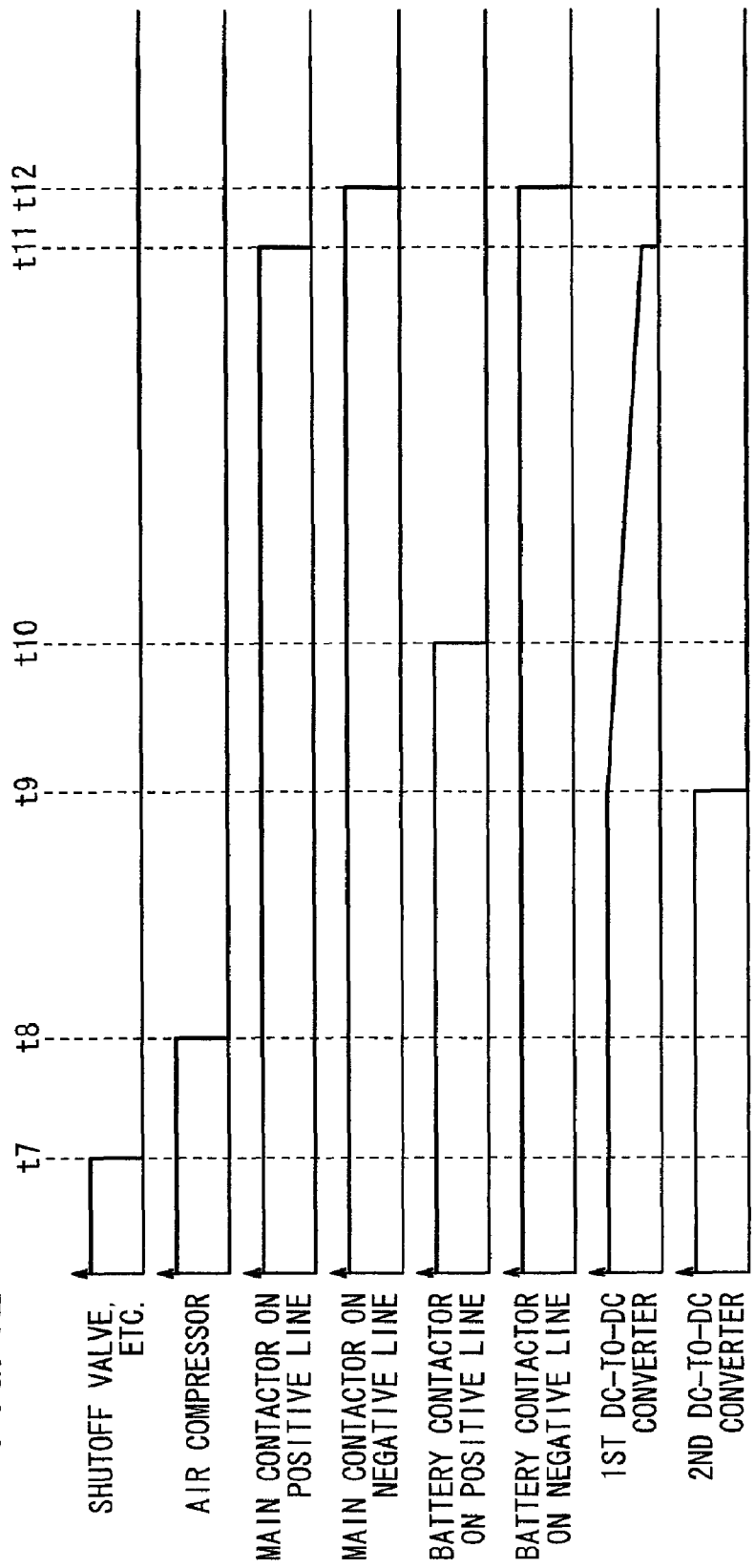
FIG. 12 is a timing chart of an inactivating sequence of the fuel cell vehicle.

Operation of the electric system 10 in the fuel cell vehicle 12 thus constructed will be described below with reference to FIGS. 8 through 12. A processing sequence, which represents a method of supplying electric power, shown in FIGS. 8 through 10 is software-implemented mainly by the power supply controller 110 and a controller of the fuel cell 14 together. In FIGS. 11 and 12, the higher level in each of the component operation statuses represents a turned-on or activated state and the lower level represents a turned-off or inactivated state, except that it represents an converted voltage for the operation of the first DC-to-DC converter 74. It is assumed in the description which follows that time elapses in the order of suffix numbers of times t1, t2, t3, . . . .

In step S1 shown in FIG. 8, the power supply switch is turned on, and the power supply controller 110 is activated and performs a predetermined initializing process. The initializing process includes a security check, a shift position check, a rotational speed check on the propulsive electric motor 17, an initialization of the RAM, etc.

In step S2, the precontactor 104 is turned on to precharge the positive line 73p of the second power supply line 73 at time t1 when the initializing process is terminated.

In step S3, the battery contactor 102n on the negative line 73n of the second power supply line 73 is turned on at time t2. Now, electric power is supplied from the electric storage device 70 to the second power supply line 73. Because of the limiting resistor 106, the electric current supplied through the second power supply line 73 is limited, protecting the contacts of the battery contactor 102n. In steps S2, S3, since the voltage V2 is applied to the second power supply line 73, the voltage V2 is also applied through the first DC-to-DC converter 74 to the first power supply line 72 to precharge the first DC-to-DC converter 74.

In step S4, the battery contactor 102p on the positive line 73p of the second power supply line 73 is turned on at time t3. A sufficient amount of electric power depending on the charged quantity of the electric storage device 70 is now supplied to the second power supply line 73. At this time, since the second power supply line 73 has been precharged, the voltage V2 remains almost unchanged, protecting the contacts of the battery contactor 102p. At a suitable time after the time t3, the precontactor 104 is turned off.

In step S5, the first DC-to-DC converter 74 starts to convert the voltage on the second power supply line 73 at time t4. The voltage on the first power supply line 72 gradually increases until it reaches the voltage V2 at time t5. At time t5, the second DC-to-DC converter 79 starts operating, starting to supply electric power to the air compressor 42.

The third DC-to-DC converter 90 operates by itself to start converting the voltage at this time, supplying electric power to the ordinary vehicle accessories including the windshield wiper motors 82 and the power window motors 84, etc.

In step S6, the main contactors 77p, 77n on the first power supply line 72 are turned on at time t5. At this time, the voltage V1 has already been applied to the first power supply line 72 by the voltage converting action of the first DC-to-DC converter 74. Inasmuch as the fuel cell 14 has been shut off, no large electric current does not flow abruptly through the main contactors 77p, 77n, so that the contacts of the main contactors 77p, 77n are protected. At time t5, the second DC-to-DC converter 79 starts operating, starting to supply electric power to the motor 42a of the air compressor 42.

In step S7, the air compressor 42 is actuated by the controller of the fuel cell 14, the back pressure valve 49 starts controlling the back pressure at time t6. Thereafter, the shutoff valve 32 is opened and the hydrogen supply pump 35 is actuated to supply a suitable amount of hydrogen gas to the fuel cell 14. The fuel cell 14 now begins to generate electric power, and supply electric power under the voltage V1 from the output terminals 14p, 14n to the first power supply line 72. The coolant circulation pump 54 is actuated to circulate the coolant to cool the fuel cell 14 to a temperature suitable for generating electric power.

The electric system 10 is activated in the manner described above, and thereafter enters a normal mode of operation.

In the normal mode of operation (see FIG. 9), a load L on the propulsive electric motor 17 is detected based on a voltage value detected by the voltage sensor 72a and a predetermined signal obtained from the inverter 16, and it is determined whether the load L is smaller than a prescribed threshold value Ls or not in step S8. If L<Ls, then control goes to step S10, and if L≧Ls, then control goes to step S11.

In step S10 (L<Ls), the power supply controller 110 instructs the second DC-to-DC converter 79 to perform chopping operation, converting the voltage V1 on the first power supply line 72 to the voltage V3 and applying the voltage V3 to the inverter 81. Thereafter, control goes to step S12.

In step S11 (L≧Ls), the power supply controller 110 instructs the second DC-to-DC converter 79 to directly connect its input terminals to its output terminals, i.e., keeps its switching devices turned on. At this time, the voltage on the first power supply line 72 has been made lower than the voltage V1, and the lower voltage is directly applied to the inverter 81. Thus, a switching loss caused by the chopping operation of the second DC-to-DC converter 79 is eliminated.

In step S12, a voltage lowering condition for the first DC-to-DC converter 74 is determined. Specifically, the voltage lowering condition is satisfied if the second electric accessory 78 consumes a large amount of electric power or a charged quantity SOC of the electric storage device 70 is less than a predetermined value and also if the fuel cell 14 has an extra current outputting capability. If the voltage lowering condition is satisfied, then control goes to step S13, and if the voltage lowering condition is not satisfied, then control goes to step S14. The voltage lowering condition and a voltage increasing condition in step S14 are determined based on output signals from the voltage sensors 74a, 74d and a sensor on the electric storage device 70.

In step S13, the power supply controller 110 instructs the first DC-to-DC converter 74 to lower the voltage V1 on the first power supply line 72 to the voltage V2, and supply electric power under the voltage V2 to the second electric accessory 78 through the second power supply line 73 or to charge the electric storage device 70. Thereafter, control goes to step S17.

Because of the processing in step S13, either electric storage device 70 is charged for use as a power supply or the second electric accessory 78 is supplied with electric power from the fuel cell 14 to make up for an electric power shortage from the electric storage device 70.

In step S14, a voltage converting condition for the first DC-to-DC converter 74 is determined. Specifically, the voltage converting condition is satisfied if the first electric accessory 76 such as the electric motor 42a or the like and the propulsive electric motor 17 consume a large amount of electric power or the output current from the fuel cell is equal to or greater than a prescribed maximum value and also if the charged quantity SOC of the electric storage device 70 is equal to or greater than the predetermined value. If the voltage increasing condition is satisfied, then control goes to step S15, and if the voltage increasing condition is not satisfied, then control goes to step S16.

In step S15, the power supply controller 110 instructs the first DC-to-DC converter 74 to increase the voltage V2 on the second power supply line 73 to the voltage V1, and supply electric power under the voltage V1 to the propulsive electric motor 17 and the first electric accessory 76 through the first power supply line 72. Thereafter, control goes to step S17.

Because of the processing in step S15, if the propulsive electric motor 17 needs to be energized with a large amount of electric current as when the fuel cell vehicle 12 is to be quickly accelerated, but the fuel cell 14 alone fails to supply electric power for such a quick acceleration, then the electric storage device 70 supplies supplementary electric power.

In step S16, both the voltage lowering action and the voltage increasing action of the first DC-to-DC converter 74 are stopped. At this time, no electric power conversion between the first power supply line 72 and the second power supply line 73 is performed. The propulsive electric motor 17 and the first electric accessory 76 are supplied with electric power from the fuel cell 14 as a sole power supply, and the second electric accessory 78 is supplied with electric power from the electric storage device 70 and the lead battery 92 which act as a power supply.

In step S17, the state of the power supply switch is confirmed. If the power supply switch remains turned on, then control goes back to step S8 to continue the normal mode of operation. If the power supply switch is turned off, then control goes to step S18 (see FIG. 10) for a shutdown process for the electric system 10.

In step S18 of the shutdown process (see FIGS. 10 and 12), the shutoff valve 32 is turned off to stop supplying hydrogen at time t7 when the turned-off state of the power supply switch is recognized.

In step S19, the air compressor 42, the hydrogen supply pump 35, and the coolant circulation pump 54 are turned off by the controller of the fuel cell 14, and the shutoff valve 32 is closed to stop supplying the hydrogen gas to the fuel cell 14 at time t8. The fuel cell 14 now stops generating electric power.

In step S20, the second DC-to-DC converter 79 is shut off to stop supplying electric power to the inverter 81 at time t9. At this time, the first DC-to-DC converter 74 lowers the voltage to discharge electric charges that are left in the fuel cell 14, gradually lowering the voltage on the first power supply line 72. The discharged electric charges are at least partly charged in the electric storage device 70.

In step S21, the battery contactor 102p is turned off at time t10 when the voltage on the first power supply line 72 becomes lower than the voltage that is suitable for charging the electric storage device 70. The electric storage device 70 now finishes being charged. The battery contactor 102n is kept turned on. The first DC-to-DC converter 74 continues its voltage lowering action, further discharging residual electric charges from the fuel cell 14. The residual electric charges are charged into the lead battery 92 through the third DC-to-DC converter 90, or consumed by the power supply controller 110, etc., or die out in course of time by way of a small electric current leakage.

In step S22, the main contactor 77p is turned off at time t11 when the voltage on the first power supply line 72 is lowered to a sufficiently small value. The first power supply line 72 is now disconnected from the output terminal 14p of the fuel cell 14, and the voltage on the first power supply line 72 is eliminated. The first DC-to-DC converter 74 and the third DC-to-DC converter 90 are shut off, and the voltage on the second power supply line 73 is eliminated. If the voltages on the first power supply line 72 and the second power supply line 73 remain essentially unchanged, then it is recognized that the contacts of the main contactor 77p suffer a failure, and a predetermined error process is carried out.

In step S23, the main contactor 77n and the battery contactor 102n are turned off at time t12, completely disconnecting the fuel cell 14 and the electric storage device 70 respectively from the first power supply line 72 and the second power supply line 73. Thereafter, a power holding mode in a power self-holding circuit which supplies electric power from the lead battery 92 to the power supply controller 110 is canceled, thus de-energizing the power supply controller 110.

With the electric system 10, the fuel cell vehicle 12, and the method of supplying electric power according to the present embodiment, as described above, the first electric accessory 76 is supplied with electric power from the first power supply line 72 and the second electric accessory 78 is supplied with electric power from the second power supply line 73. Therefore, the first electric accessory 76 and the second electric accessory 78 can be set to different voltage specifications depending on applications, allowing the electric system 10 to have a improved energy efficiency and to be constructed inexpensively.

The air compressor 42 as the first electric accessory 76 is part of the fuel cell accessory for operating the fuel cell 14, and the second electric accessory 78 is an electric accessory other than the fuel cell accessory. Consequently, the fuel cell accessory may be improved energy efficiency, and the second electric accessory 78 may be an ordinary general-purpose vehicle accessory, so that the electric system 10 can be of a lower cost.

The first electric accessory 76 as the fuel cell accessory for operating the fuel cell 14 is supplied with electric power from the first power supply line 72, and is not supplied with electric power directly from the second power supply line 73 without the first DC-to-DC converter 74 interposed therebetween. Therefore, even if the first DC-to-DC converter 74 accidentally fails to perform its voltage converting function or voltage lowering function, the first electric accessory 76 is supplied with electric power from the fuel cell 14 through the first power supply line 72, allowing the fuel cell vehicle 12 to continue traveling a longer distance or a longer period of time.

In this case, the electric storage device 70 and the lead battery 92 are not charged. However, since the second electric accessory 78 consumes less electric power than the first electric accessory 76, the electric storage device 70 and the lead battery 92 are discharged at a limited rate and keep operating for a considerably long period of time. Even if the charged quantities of the electric storage device 70 and the lead battery 92 are reduced to the extent that the second electric accessory 78 is no longer energized, the first electric accessory 76, the propulsive electric motor 17, etc. keep operating with the electric power supplied from the fuel cell 14, so that the fuel cell vehicle 12 continues to travel. Stated otherwise, the fuel cell vehicle 12 requires no special measures for continuing traveling or enabling itself to travel for a predetermined distance in an accidental situation where the first DC-to-DC converter 74 fails to operate. The electric storage device 70 does not necessarily supply electric power to the first electric accessory 76 to keep the fuel cell vehicle 12 traveling. Therefore, basically, the electric storage device 70 may be of a small capacity that is only large enough to energize the second electric accessory 78 and also to actuate the air compressor 42 when it starts to operate.

Since the air compressor 42 as the first electric accessory 76, the hydrogen supply pump 35, and the coolant circulation pump 54 serve as a high load, they are connected to the first power supply line 72 carrying the voltage V1 for a better energy efficiency.

In the electric system 10, the voltage of the first electric accessory 76 is used commonly regardless of the vehicle size. Accordingly, the fuel cell vehicle 12 can be designed in a shorter period of time, and can be manufactured at a lower cost and with increased productivity.

The second electric accessory 78 includes the electrically operated air conditioner motor 80 which serves as a relatively high load, and the electrically operated air conditioner motor 80 is supplied with electric power from the second power supply line 73. Therefore, the electrically operated air conditioner motor 80 is not affected by voltage specifications of the first power supply line 72 which carries a different voltage depending on the vehicle size, and the fuel cell vehicle 12 does not need a large-capacity DC-to-DC converter for connecting the electrically operated air conditioner motor 80 to the first power supply line 72.

Inasmuch as the windshield wiper motors 82 and the power window motors 84, etc. are connected to the second power supply line 73 through the third DC-to-DC converter 90, the voltage for the electrically operated air conditioner motor 80 and the voltages for the other vehicle accessories can be set to different values, so that the electrically operated air conditioner motor 80 can be set to a suitable voltage specification depending on the load thereon. Furthermore, the windshield wiper motors 82 and the power window motors 84, etc. are set to a voltage (e.g., 12 V), and hence can be ordinary general-purpose vehicle accessories. When they are connected to the lead battery 92, their operation is stabilized.

Figure 13:
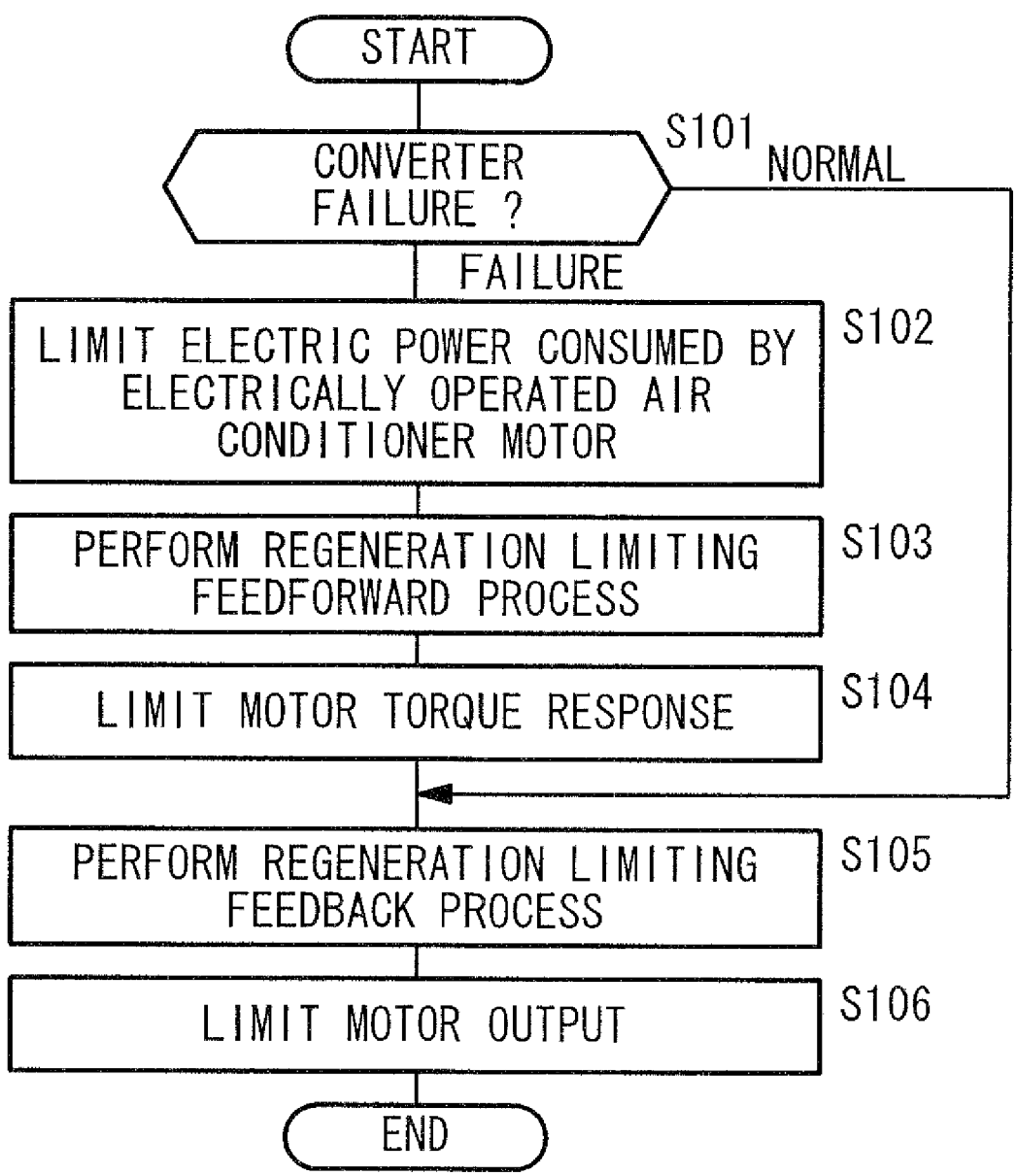
FIG. 13 is a flowchart of a control sequence including a process of detecting a failure of a DC-to-DC converter and a process of limiting the response of electric power output from the fuel cell when a failure of the DC-to-DC converter is detected.

A process of detecting a failure of the first DC-to-DC converter 74 and taking a countermeasure against the failure will be described below with reference to FIG. 13. The sequence shown in FIG. 13 is carried out by the power supply controller 110 in given small time cycles.

In step S101, a given failure detector determines whether there is a converter failure or not. If a converter failure is detected, then control goes to step S102. If no converter failure is detected, then control jumps to step S105. A converter failure is judged by detecting electric currents at the input and output sides of the first DC-to-DC converter 74 and determining whether a proper electric current flows through the first DC-to-DC converter 74 or not. If the first DC-to-DC converter 74 has a function to output a failure signal in the event of a converter failure, then a converter failure may be judged based on the failure signal.

In step S102, the electric power consumed by the electrically operated air conditioner motor 80 is limited or the electrically operated air conditioner motor 80 is turned off. The electrically operated air conditioner motor 80 is connected closer to the electric storage device 70 than the first DC-to-DC converter 74 (see FIG. 7). Of fuel cell accessories for operating the fuel cell 14, the fuel cell controller 206, valves, a radiator fan, etc., which consume a small amount of electric power, are generally connected to the second power supply line 73. When the electric power consumed by the electrically operated air conditioner motor 80 is limited, the electric power discharged from the electric storage device 70 is limited, increasing the operating times of these fuel cell accessories which consume a small amount of electric power. As a result, the operating time of the fuel cell 14 is increased, allowing the fuel cell vehicle 12 to travel a longer distance.

In step S103, a regeneration limiting feedforward process is performed. Specifically, a failure regenerative electric power limit value is selectively set to a predetermined value for a process in step S105.

In step S104, a motor torque response limiting process is performed. Specifically, a motor torque command is limited based on an allowable torque change based on the vehicle speed. By thus limiting the response of the propulsive electric motor 17, the response of the electric power output from the fuel cell 14 is also limited. The loads on the fuel cell 14 include the propulsive electric motor 17, the hydrogen supply pump 35, the air compressor 42, and the coolant circulation pump 54. Of these loads, the propulsive electric motor 17 is the largest. Therefore, the response of the electric power output from the fuel cell 14 can effectively be limited by limiting the torque of the propulsive electric motor 17.

In step S105, a regeneration limiting feedback process is performed. Specifically, a maximum regenerative amount of the propulsive electric motor 17 is limited based on the difference between a system upper limit voltage and the voltage V1 for thereby preventing the voltage V1 on the first power supply line 72 from increasing excessively.

In step S106, a motor output limiting process is performed. Specifically, an allowable motor output electric power upper limit value is established based on the difference between a smaller one of the amount of electric power that can be generated by the fuel cell 14 and the amount of electric power required by the load system, and the amount of electric power generated by the fuel cell 14. According to the motor output limiting process, the output of the propulsive electric motor 17 is appropriately limited. After step S106, the control sequence shown in FIG. 13 is finished in the present cycle.

Generally, the supplied amounts of the fuel gas and the reactive gas in the fuel cell 14 are established depending on the generated amount of electric power. A certain limitation is posed on a quick change in the supplied amounts of the fuel gas and the reactive gas because of the inertia of the fluid, piping resistances, and air compressor dynamic characteristics, possibly causing the system to fail to catch up on a required change in the electric power, i.e., to fail to be sufficiently responsive. If the first DC-to-DC converter 74 suffers a failure, as no assistive electric current is supplied from the electric storage device 70, the fuel cell 14 needs to generate electric power in excess of an allowable change in electric power, resulting in insufficient capabilities of the pumps for supplying the fuel gas and the reactive gas. As a consequence, the fuel cell 14 operates in gas shortages, and tends to be deteriorated soon.

Since the sequence shown in FIG. 13 includes the process of detecting a failure of the first DC-to-DC converter 74 and the process of limiting the response of the electric power output from the fuel cell 14 if a failure of the first DC-to-DC converter 74 is detected, a gas shortage in the fuel cell 14 is avoided even if there is no assistive electric current from the electric storage device 70, so that the fuel cell 14 is prevented from being unduly deteriorated. Because the response is limited, the amount of a fuel gas that is consumed is reduced, allowing the fuel cell vehicle 12 to travel a longer distance.

Figure 14:
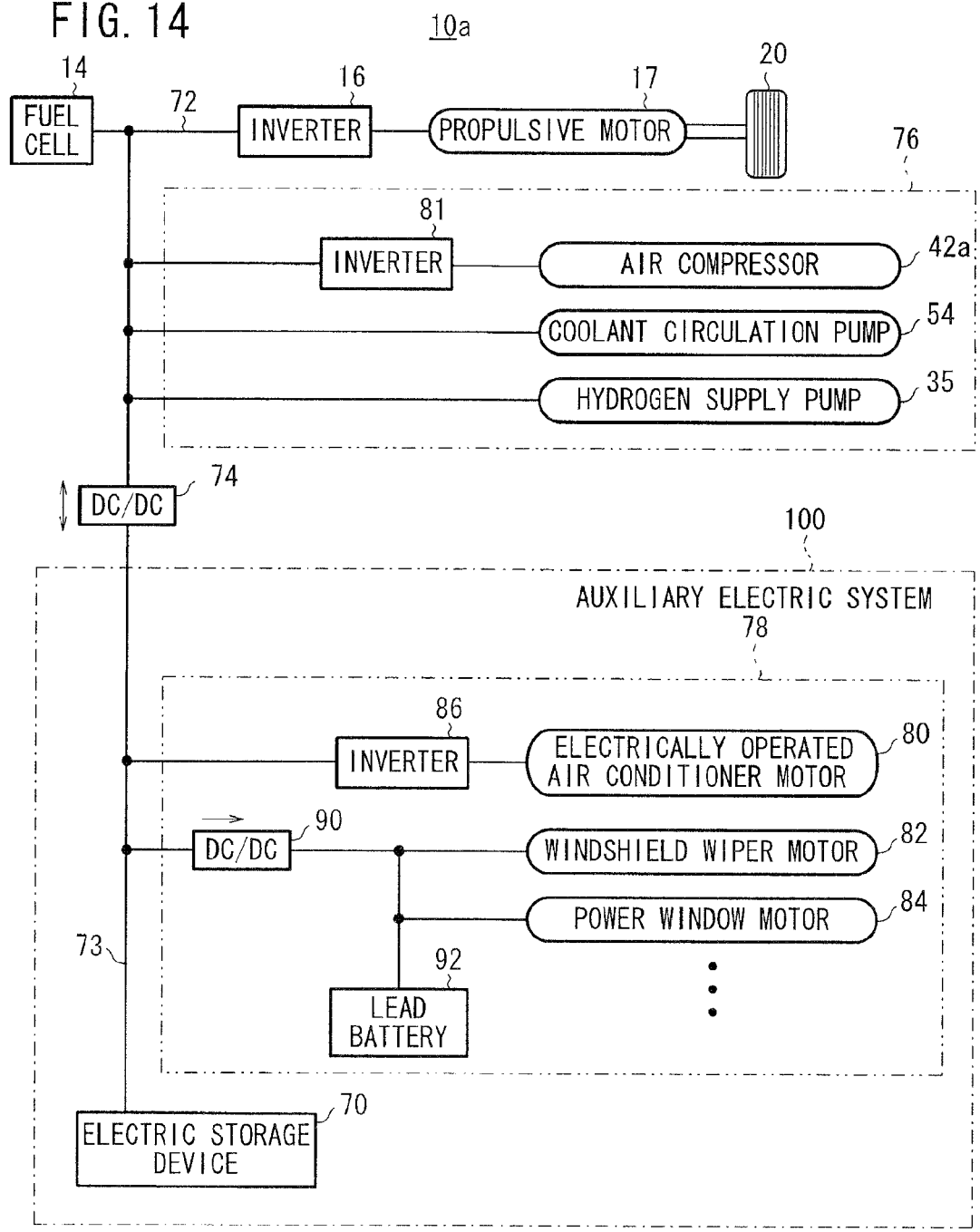
FIG. 14 is a block diagram of a fuel cell vehicle according to a first modification.

The electric system 10 may be modified depending on the makeup of the first electric accessory 76, as follows:

FIG. 14 shows in block form an electric system 10a according to a first modification. In the electric system 10a, the air compressor 42, the coolant circulation pump 54, and the hydrogen supply pump 35 of the first electric accessory 76 are of voltage specifications corresponding to the voltage V1 on the first power supply line 72, and are directly connected to the first power supply line 72 without any voltage-converting DC-to-DC converter interposed therebetween.

Figure 15:
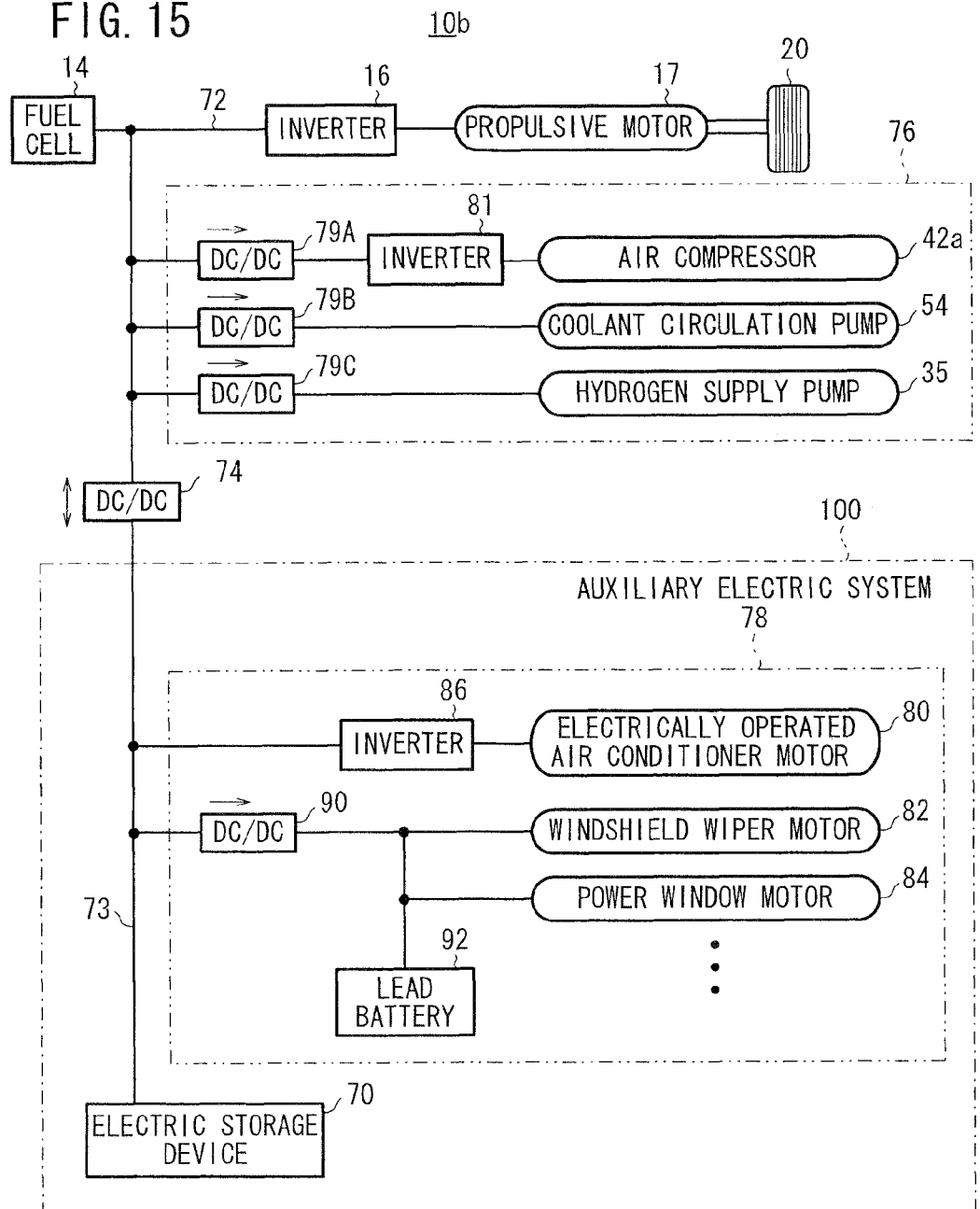
FIG. 15 is a block diagram of an electric system for a fuel cell vehicle according to a second modification.
Figure 16:
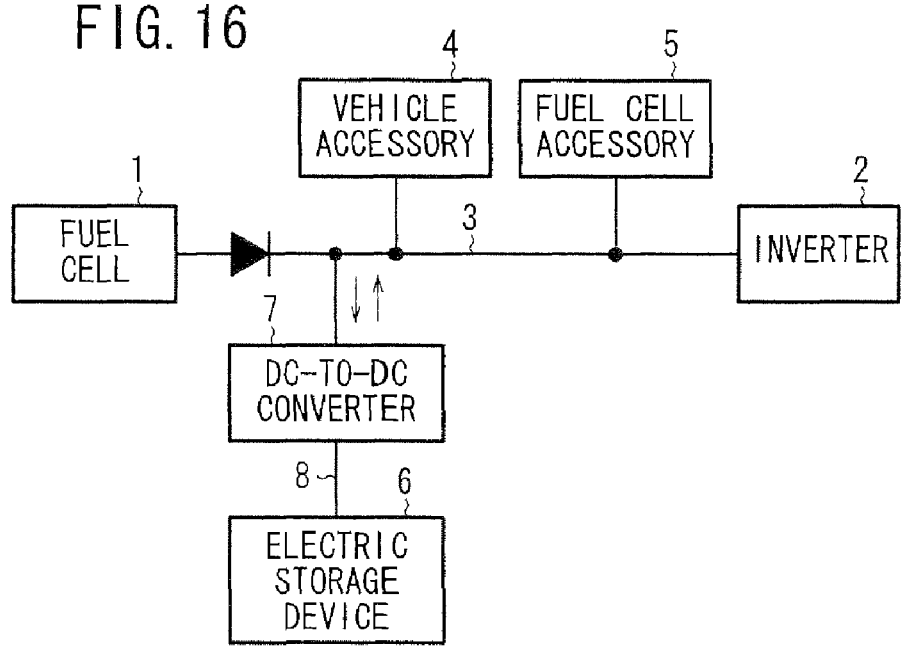
FIG. 16 is a block diagram of a conventional electric system.
Figure 17:
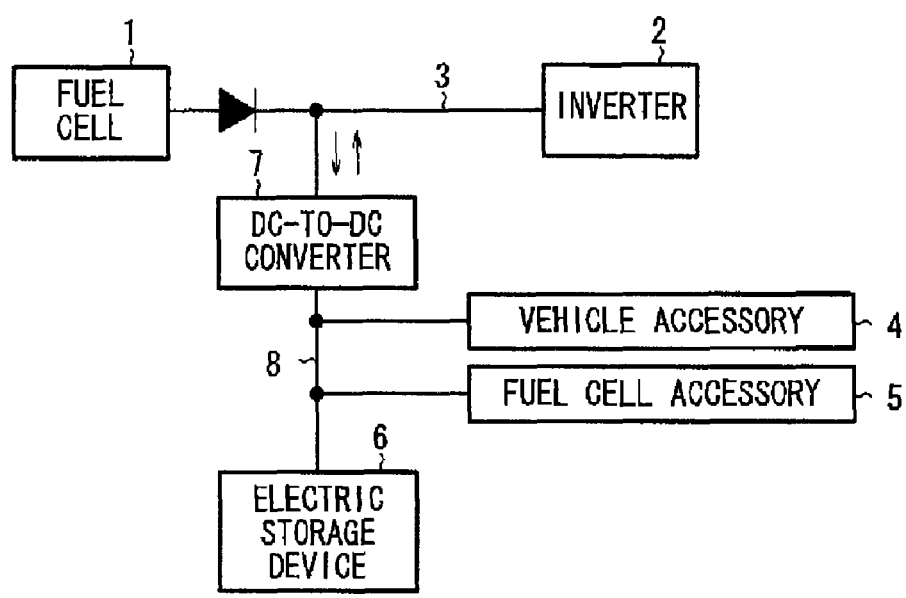
FIG. 17 is a block diagram of another conventional electric system.

FIG. 15 shows in block form an electric system 10b according to a second modification. In the electric system 10b, the air compressor 42, the coolant circulation pump 54, and the hydrogen supply pump 35 are of individual voltage specifications corresponding to respective loads, and are supplied with electric power from respective DC-to-DC converters 79A, 79B, 79C which converts the supplied voltage into respective voltages for the air compressor 42, the coolant circulation pump 54, and the hydrogen supply pump 35.

As with the electric system 10, the electric systems 10a, 10b are versatile and are inexpensive to construct, and can continuously operate the fuel cell 14 for a considerably long period of time even in the event of a failure of the first DC-to-DC converter 74.

Although certain preferred embodiments of the present invention have been shown and described in detail, it should be understood that various changes and modifications may be made therein without departing from the scope of the appended claims.

What is claimed is:

1. A fuel cell vehicle, comprising:
   a fuel cell for generating electric power by being supplied with a reactive gas;
   an electric storage device;
   a first power supply line connected to said fuel cell;
   a second power supply line connected to said electric storage device;
   a main DC-to-DC converter for performing bidirectional voltage conversion between said first power supply line and said second power supply line;
   an electric motor to propel the vehicle and a first electric accessory connected to said first power supply line being supplied with electric power from said first power supply line without traversing the main DC/DC converter; and
   a second electric accessory having at least a portion connected to said second power supply line through an auxiliary DC-to-DC converter for being supplied with electric power from said second power supply line,
   wherein another portion of said second electric accessory is connected to said first power supply line through the main DC-to-DC converter, and
   wherein a first end of the second power supply line is connected to the electric storage device and a second end of the second power supply line is connected to the auxiliary DC-to-DC converter.

2. A fuel cell vehicle according to claim 1, wherein said first electric accessory comprises at least one of an air compressor for supplying air under pressure to said fuel cell, a hydrogen pump for supplying hydrogen to said fuel cell, and a coolant circulation pump for cooling said fuel cell.

3. A fuel cell vehicle according to claim 1, wherein said first electric accessory has at least a portion connected to said first power supply line through a fuel cell DC-to-DC converter.

4. A fuel cell vehicle according to claim 3, wherein said fuel cell DC-to-DC converter:
   converts a voltage applied thereto,
   supplies a converted voltage to said first electric accessory when a load on said electric motor is smaller than a prescribed threshold value, wherein the electric motor is supplied with electric power from said first power supply line,
   directly connects input and output terminals of said electric motor, and supplies electric power through the input and output terminals to said first electric accessory when the load on said electric motor is equal to or greater than said prescribed threshold value.

5. A fuel cell vehicle according to claim 1, wherein said second electric accessory includes at least an electrically operated air conditioner motor.

6. A fuel cell vehicle according to claim 5, wherein the portion of said second electric accessory that is connected to said second power supply line through the auxiliary DC-to-DC converter is exclusive of said electrically operated air conditioner motor.

7. A fuel cell vehicle, comprising:
   a fuel cell for generating electric power by being supplied with a reactive gas;
   a first power supply line connected to said fuel cell;
   a first electric accessory serving as at least part of a fuel cell accessory for operating said fuel cell, said first electric accessory being connected to said first power supply line for being supplied with electric power from said first power supply line without traversing the main DC/DC converter;
   an electric motor to propel the vehicle;
   an auxiliary electric system; and
   a main DC-to-DC converter for performing bidirectional voltage conversion, said main DC-to-DC converter connecting said auxiliary electric system to said first power supply line;
   said auxiliary electric system comprising:
      a first electric storage device;
      a second power supply line connecting said first electric storage device and said main DC-to-DC converter to each other; and
      a second electric accessory serving as an electric accessory other than said fuel cell accessory, wherein:
         at least a portion of said second electric accessory being connected to said second power supply line through an auxiliary DC-to-DC converter,
         the second electric accessory is supplied with electric power from said second power supply line, and
         another portion of said second electric accessory is connected to said first power supply line through the main DC-to-DC converter
         a first end of the second power supply line is connected to the first electric storage device and a second end of the second power supply line is connected to the auxiliary DC-to-DC converter.

8. A fuel cell vehicle according to claim 1, wherein the portion of said second electric accessory that is connected to said first power supply line through the main DC-to-DC converter includes at least an electrically operated air conditioner motor.

* * * * *